Sept. 1, 1970  W. TRENKLER ET AL  3,526,427
MOTOR VEHICLE MULTISECTIONAL ROOF
Filed Sept. 18, 1967  2 Sheets-Sheet 1

INVENTORS
Werner TRENKLER
Karl VETTEL
By

Craig & Antonelli
their ATTORNEYS

INVENTORS
Werner TRENKLER
Karl VETTEL

United States Patent Office 3,526,427
Patented Sept. 1, 1970

3,526,427
MOTOR VEHICLE MULTISECTIONAL ROOF
Werner Trenkler, Asperg, Kreis Ludwigsburg, and Karl Vettel, Ludwigsburg-Hoheneck, Germany, assignors to Firma Dr. Ing. h.c.F. Porsche KG, Stuttgart-Zuffenhausen, Germany
Filed Sept. 18, 1967, Ser. No. 668,448
Claims priority, application Germany, Oct. 7, 1966, 1,580,560
Int. Cl. B60d 25/06
U.S. Cl. 296—137        12 Claims

ABSTRACT OF THE DISCLOSURE

A motor vehicle multisectional roof including a roll yoke bridging the passenger compartment onto which is fastened a front cover and a pliable material rear cover, whereby the rear cover is supported along stationary portions of the vehicle body by means of tensioning locks acting upon elastic reinforcements along the edge portions of the rear cover. Preferably, the tensioning locks are mounted upon the roll yoke and cooperate with the adjacent elastic reinforcements. Stops are associated with the tensioning locks to limit the range of movement of the adjacent rear cover reinforcements toward and away from the roll yoke. These stops are preferably threaded bolts adjustable in their effective length to selectively change the range of tensioning movement.

BACKGROUND OF THE INVENTION

It is known to provide motor vehicles, particularly sports cars with a roll yoke bridging the passenger compartment and being provided with a front cover and a flexible rear cover attached thereto. It is especially important to securely attach the rear cover at the stationary parts of the motor vehicle to avoid fluttering of the rear cover at high vehicle speeds. The fastening of the rear cover has been accomplished with a plurality of screws equally spaced around the circumference of the rear cover, which is provided at its edges with a stable frame. However, the rear cover is often subdivided by means of a zipper whereby sections of the rear cover may be separated and lowered into the passenger compartment. During operation of this zipper, it is desirable to have the cover loosely tensioned so that it will be relatively easy to operate the zipper; as mentioned above, it is desirable to have the cover tightly tensioned to prevent fluttering at high speeds. In the past, it has been impossible to satisfy both of the desirable requirements and the resulting compromise has proved to be unsatisfactory.

SUMMARY OF THE INVENTION

It is an object of the present invention to provide a multisectional cover that will be loosely tensioned for purposes of separation, for example, by zippers and that will be tightly tensioned during driving at high speeds to prevent fluttering.

According to the present invention, tensioning locks are provided to mount the rear cover at stationary portions of the motor vehicle body. As a result, the tension of the rear cover is sufficient to prevent fluttering during driving and, the tension of the cover is reduced when it is desired to operate the zippers or otherwise subdivide the cover. With the present invention, the strain of the attached portions of the cover and the zipper is held to a minimum, and the danger of damaging the sections is materially reduced. The tensioning locks act upon elastic reinforcements of the rear cover, which extend along the edges of the covering. By means of these elastic reinforcements, the cover is subjected to nearly equal tension.

In order to prevent a complete separation of the locking members during operation of the tensioning locks, the opening movement or loosening movement of the tensioning locks is limited within a definite range by means of stops. The stops are adjustable in the loosening direction, preferably by being constructed as threaded bolts.

Further objects, features and advantages of the present invention will become more clear from the following detailed description of the drawing.

DETAILED DESCRIPTION OF THE DRAWING

Figure 1:
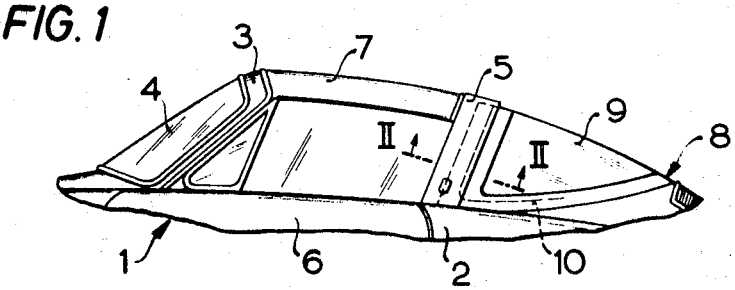
FIG. 1 is a partial side elevation view of a vehicle employing the multisectional roof of the present invention.

As shown in FIG. 1, the motor vehicle 1 is provided with a relatively rigid main vehicle body 2 having a windshield frame 3 carrying therein the windshield 4. A roll yoke 5 transversely bridges the passenger compartment and is attached at its opposite ends to the main body 2. The main body 2 is provided with a door 6 for entering the passenger compartment. A front roof section or roof cover 7 is detachably connected to and extends between the windshield frame 3 and the roll yoke 5 to cover the main portion of the passenger compartment. A rear cover 8 covers the rear portion of the passenger compartment and is detachably connected to and extends between the roll yoke 5 and the main vehicle body 2 of the motor vehicle.

The rear cover 8 consists of an easily pliable material such as cloth, or synthetic material, and is provided with a window 9 constructed of a material with the required characteristics. The rear cover is subdivided, that is, partially separable, by means of a zipper 10 so that the section of the rear cover containing the window 9 may be lowered into the passenger compartment.

The rear cover 8 is provided along its edges with reinforcement members 11, which consist of tubes extending continuously around the edge portions of the rear cover to constitute an elastic frame. The fastening of the rear cover 8 to the body 2 and the roll yoke 5 is detachable through the reinforcements 11.

In order to regulate the tension of the rear cover, attachment of the rear cover is accomplished at the roll yoke 5 by means of tensioning locks 12. A preferred embodiment of the tensioning locks 12 is illustrated in detail in FIGS. 2 and 3. Each of the tension locks 12 is provided with a shaft 13 having on its circumferential surface a plurality of (two being illustrated) serpentine cams or grooves 14, 15. A hand lever 16 is drivingly connected to the shaft 13 so that the shaft 13 may be manually rotated. The shaft 13 is mounted on the roll yoke by means of the bearing 17 so that it may only rotate with respect to the roll yoke 5.

The adjacent portion of the tube reinforcement 11 is rigidly secured to a metal stamping 18, which is rigidly fastened to a sleeve 19 having two diametrically opposed pins 20 extending inwardly into the cam serpentine slots 14, 15 of the shaft 13. During rotation of the shaft 13 by means of the hand lever 16, the pins 20 engage within and travel within the cam grooves 14, 15 to impart an axial movement to the sleeve 19 with respect to the roll yoke 5, so that a corresponding axial movement of the reinforcement 11 is obtained to selectively loosen or tension the rear cover 8. The axial movement is with respect to the axis of the shaft 13.

Figure 2:
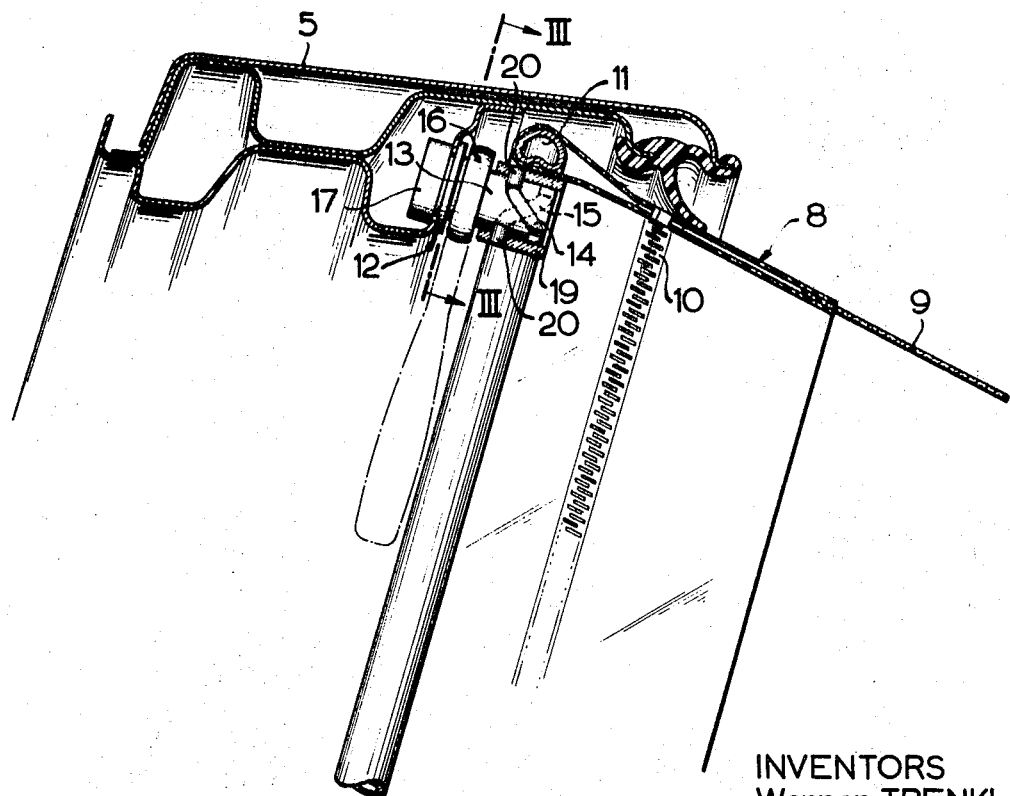
FIG. 2 is a partial cross-sectional view taken along line II—II of FIG. 1 on an enlarged scale.
Figure 3:
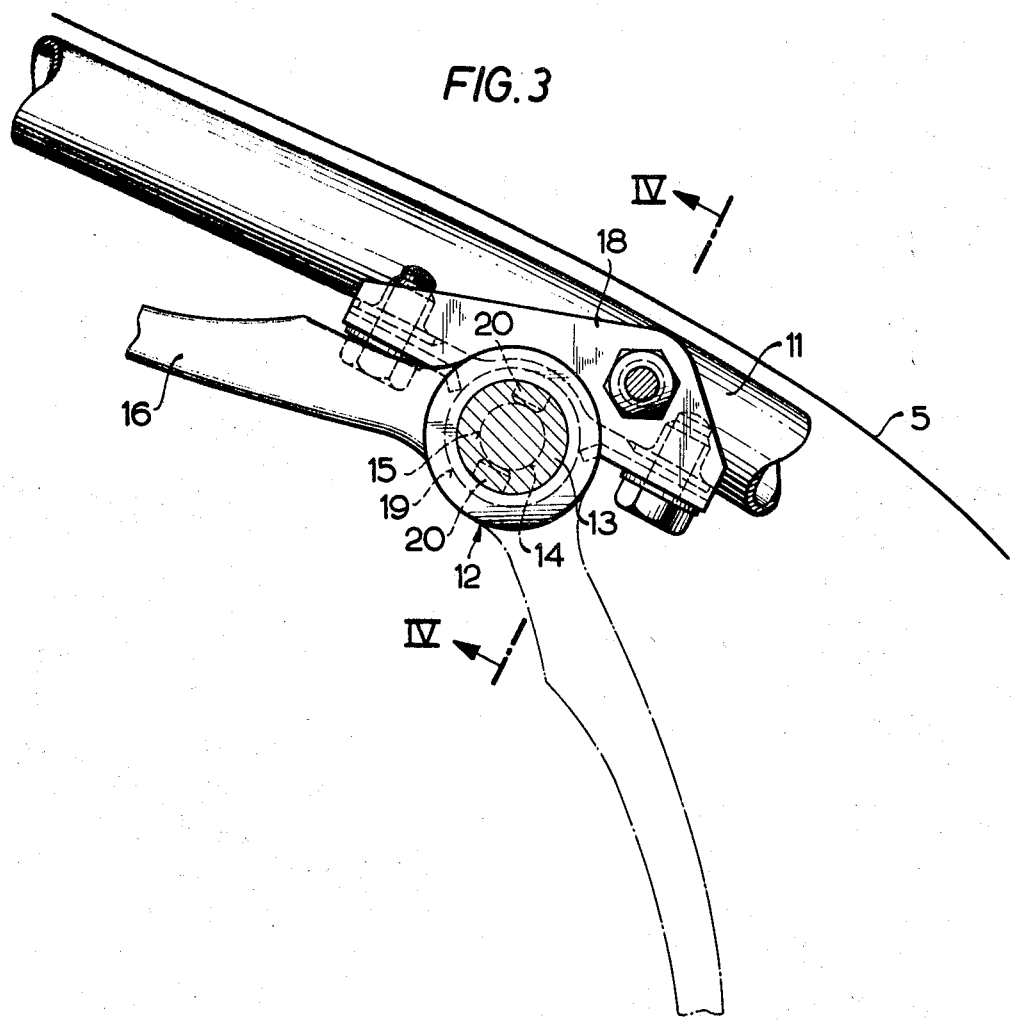
FIG. 3 is a cross-sectional view taken along line III—III of FIG. 2, on an enlarged scale.

The rear cover 8 is tightly tensioned when the hand lever 16 is in the solid line position of FIG. 3. The rear cover 8 is in its loose condition when the hand lever 16 is in the dot-dash position as shown in FIGS. 2 and 3.

Figure 4:
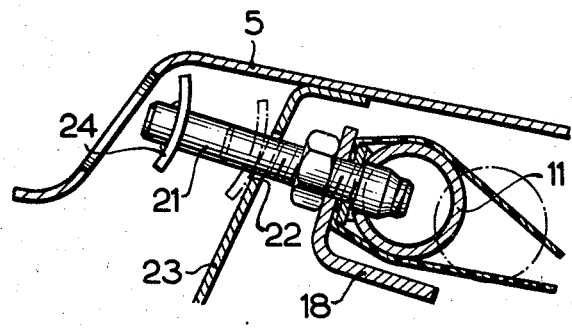
FIG. 4 is a partial cross-sectional view taken along line IV—IV of FIG. 3.

In order to avoid complete separation of the shaft 13 from the sleeve 19 during operation of the tensioning lock to loosen the rear cover 8, the action of the tensioning lock is limited, that is, the movement of the adjacent reinforcement 11 toward and from the roll yoke is only within fixed limits or within a fixed range. A specific preferred example of such a limiting device or stop is illustrated in FIG. 4 in detail. The stop includes a threaded bolt 21 that is rigidly secured to the reinforcement tube 11. The threaded bolt 21 extends through an opening 22 in a metal stamping 23 forming a portion of the roll yoke. The other free end of the bolt 21 is provided with a stop plate 24 that is substantially larger than the opening 22. The effective length of the threaded bolt extending between the reinforcement tube 11 and the stop plate 24 is adjustable and determines the range within which the reinforcement 11 is movable during the tensioning and loosening of the rear cover 8 by means of the tensioning lock. This adjustment is accomplished by merely rotating the bolt 21 within its threaded securement. FIG. 4 illustrates one end position of the threaded bolt stop 21 corresponding to the loosened condition of the rear cover 8, in dot and dash lines, when the stop plate 24 engages the stamping 23. While only one of the tensioning locks has been described, it is understood that a plurality of tensioning locks are provided spaced along the roll yoke 5 and are substantially identical.

A preferred embodiment of the present invention has been described in detail for purpses of illustration; further embodiments, modifications and variations are contemplated, for example, an eccentric type of tensioning lock may be employed and adjustable stops may be provided for determining the limiting positions of the hand lever 16 for determining the corresponding range of movement of the tensioning lock instead of the serpentine cam tensioning lock and bolt stop as specifically illustrated, within the spirit and scope of the present invention.

What is claimed is:

1. A motor vehicle having a main body, passenger compartment and multisectional roof covering the passenger compartment, wherein the multisectional roof includes a roll yoke transversely bridging the passenger compartment and attached to each end to the main body, a front cover extending longitudinally from the roll yoke forwardly to the main body, and a rear cover consisting of pliable material extending longitudinally from the roll yoke rearwardly to the main body; wherein the improvement comprises tensioning lock means for selectively moving the adjacent edge portions of the rear cover positively under tension toward and away from at least one of said main body and said roll yoke, and wherein said rear cover includes elastic reinforcement members along its edges and said lock means acts on said elastic reinforcement members.

2. The motor vehicle according to claim 1, wherein said tensioning lock means includes a plurality of telescopically engaged pairs of sleeve members and shaft members, serpentine interengaging cams between said members of each pair for positively producing relative axial movement between the members when said members are rotated with respect to each other, means mounting said members for relative rotational movement; means mounting one of said members axially fixed on at least one of said roll yoke and said main body; means axially fixing the other of said members on the adjacent edge portion of said rear cover.

3. The motor vehicle according to claim 1, wherein said elastic reinforcement members include transversely highly elastic tubes extending substantially continuously around the edge of said rear cover.

4. The motor vehicle according to claim 1, wherein said tension lock means includes stop means positively limiting movement of said adjacent edge portions within a fixed range.

5. The motor vehicle according to claim 4, wherein said stop means are threaded bolts, adjustable in their effective length to selectively change said fixed range.

6. The motor vehicle according to claim 1, wherein said lock means is arranged at the roll yoke and cooperates with the portion of the elastic reinforcement members of the rear cover extending along and adjacent to the roll yoke.

7. The motor vehicle of claim 6, wherein said tension lock means includes stop means positively limiting movement of said adjacent edge portions within a fixed range.

8. The motor vehicle of claim 7, wherein said stop means are threaded bolts, adjustable in their effective length to selectively change said fixed range.

9. The motor vehicle according to claim 1, wherein said tension lock means includes stop means positively limiting movement of said adjacent edge portions within a fixed range.

10. The motor vehicle according to claim 9, wherein said stop means are threaded bolts, adjustable in their effective length to selectively change said fixed range.

11. The motor vehicle according to claim 10, wherein said roll yoke includes a relatively stationary rigid member having a plurality of holes receiving therein, respectively, said threaded bolts; each of said threaded bolts having a transverse stop member transversely overlapping radially outwardly the edges of the corresponding hole at the axial end of the bolt opposite from said rear cover; the opposite axial end of each of said bolts being rigidly connected to said rear cover.

12. The motor vehicle according to claim 11, including means threadably connecting said bolt to said rear cover for selectively changing the axial spacing of said transverse stop member from said rear cover to correspondingly selectively change said fixed range.

References Cited

UNITED STATES PATENTS

| | | | |
|---|---|---|---|
| 830,220 | 9/1906 | Gibson | 280—179.1 |
| 2,002,596 | 5/1935 | Westrope | 296—138 |
| 3,091,494 | 5/1963 | Cohen | 296—145 |
| 3,252,731 | 5/1966 | Brywn et al. | 296—117 |

LEO FRIAGLIA, Primary Examiner

L. J. PAPERNER, Assistant Examiner

U.S. Cl. X.R.

160—328, 378